United States Patent [19]

Zenick et al.

[11] Patent Number: 4,546,266
[45] Date of Patent: Oct. 8, 1985

[54] MAGNETICALLY ACTUATED INTERLOCK

[76] Inventors: Walter N. Zenick, 144 South Rd., Farmington, Conn. 06032; Richard J. Zenick, 27 Boardman Ter., Weathersfield, Conn. 06109

[21] Appl. No.: 517,972

[22] Filed: Jul. 28, 1983

[51] Int. Cl.⁴ .................. B60R 25/04; H01H 47/32
[52] U.S. Cl. ................. 307/10 AT; 361/172; 361/180; 361/196; 340/63; 340/64; 180/287
[58] Field of Search ............. 307/10 AT, 116, 309, 307/10 R; 361/172, 194, 196, 199, 180; 340/64, 63; 328/5; 323/250, 331; 180/287

[56] References Cited

U.S. PATENT DOCUMENTS

| | | | |
|---|---|---|---|
| 3,723,967 | 3/1973 | Atkins et al. | 340/64 X |
| 3,732,467 | 5/1973 | Mills | 307/598 X |
| 3,902,075 | 8/1975 | Oros | 307/10 AT |
| 4,107,962 | 8/1978 | MacKinnon | 307/10 AT X |
| 4,240,516 | 12/1980 | Henderson et al. | 307/10 AT X |
| 4,315,160 | 2/1982 | Levine | 307/10 AT |
| 4,323,878 | 4/1982 | Luzynski | 307/10 AT X |
| 4,347,545 | 8/1982 | Weishaupt et al. | 307/10 AT X |

Primary Examiner—Reinhard J. Eisenzopf
Assistant Examiner—Derek S. Jennings

[57] ABSTRACT

An electrical circuit, the starting circuit for a motor vehicle for example, is selectively enabled by a control circuit which includes a magnetic field responsive switching device. Proper positioning of a magnet which provides a field of the appropriate polarity and strength relative to the switching device results in the energization of a relay which has contacts connected in series with the circuit being controlled. In the motor vehicle application, operation of the ignition switch within a pre-determined time subsequent to removal of the magnet will latch the relay in the energized state.

18 Claims, 2 Drawing Figures

MAGNETICALLY ACTUATED INTERLOCK

BACKGROUND OF THE INVENTION (1) Field of the Invention

The present invention relates to the prevention of the unauthorized operation of equipment and particularly to impeding or precluding theft of motor vehicles. More specifically, this invention is directed to an enabling-/disabling device for association with electrically actuated machinery and especially to security apparatus which may be employed to render the starting system of a motor vehicle inoperative. Accordingly, the general objects of the present invention are to provide novel and improved methods and apparatus of such character.

(2) Description of the Prior Art

While not limited thereto in its utility, the present invention is particularly well-suited for preventing the unauthorized operation of vehicles having engines which are started by means of an electrically actuated started system. An example of the operating environment for the present invention, accordingly, is an automobile having an electrically operated starter motor. For a number of reasons, it is desirable to employ an interlock system which permits the engine of a motor vehicle to be started only by authorized personnel and-/or by an individual whose reflexes have not been impaired by alcohol or narcotics.

Numerous techniques for selectively disabling and enabling the ignition and/or starting circuit of motor vehicles have previously been suggested. Thus, by way of example, ignition circuit disabling switches have been secreted at various places in an automobile, the location of the switches being known only to the owner/operator. It has also been proposed to employ keypads and associated logic circuitry which would enable all or parts of the vehicle's electrical system only when a multi-digit code was entered via the keypad within a predetermined time period. A further prior art approach to rendering a motor vehicle theft-resistant has been to employ a dual system wherein a first coded key was utilized to enable the vehicle electrical system whereupon the regular ignition key could be employe to start the vehicle.

The prior art systems for preventing unauthorized vehicle operation have often been characterized by rather complex electronics which rendered the systems expensive, difficult to install and of somewhat suspect reliability. The prior systems have also been plagued by inoperability due to a susceptibility to vibration induced damage and/or the inability to withstand the temperatures extremes to which they have been subjected. As an additional disadvantage of prior art systems, they have either been exceedingly difficult or impossible to by-pass by the owner/operator. Accordingly, when in an environment such as a public parking garage or a repair shop, where it was necessary to leave a key to permit the vehicle to be moved, it became necessary to inform the attendant of the details of the enabling/disabling system, i.e., the code, location of hidden switch, etc. The necessity of revealing such information, of course, compromises the security of the system.

SUMMARY OF THE INVENTION

The present invention overcomes the above-briefly discussed and other deficiencies and disadvantages of the prior art by providing a novel and improved technique for selectively disabling and/or enabling a supervised electrical circuit and particularly a starter circuit for a piece of machinery. The present invention also encompasses unique apparatus for use in practicing this novel technique.

Apparatus in accordance with the invention includes a magnetically actuated switching device. This switching device, in accordance with the preferred embodiment, is a solid state Hall effect sensor. Apparatus in accordance with the present invention further comprises a magnetic "key" of suitable characteristics to cause actuation of the Hall sensor. The apparatus also comprises circuitry which, in response to the switching of the Hall sensor, will provide a signal for enabling the circuit being supervised for a predetermined time period.

In a preferred embodiment, apparatus in accordance with the present invention includes a cable harness by means of which the control signal generating circuitry is coupled to the sensor and the circuit being supervised. This cable harness terminates in a multi-terminal receptacle in which only two terminals are utilized in the supervised circuit. These two terminals may be varied from installation to installation. A "service" plug, coded to match the cable harness, is provided. By unplugging the cable harness from the control signal generator and inserting the service plug in the receptacle, the enabling/disabling system may be quickly and easily by-passed.

Apparatus in accordance with a preferred embodiment of the invention also includes a light emitter which will be mounted in such a manner as to inform the operator of the time period during which the circuit being supervised is in the active state.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 3 is front elevation view of a service plug for use with the apparatus of FIG. 2.

DESCRIPTION OF THE DISCLOSED EMBODIMENT

Figure 1:
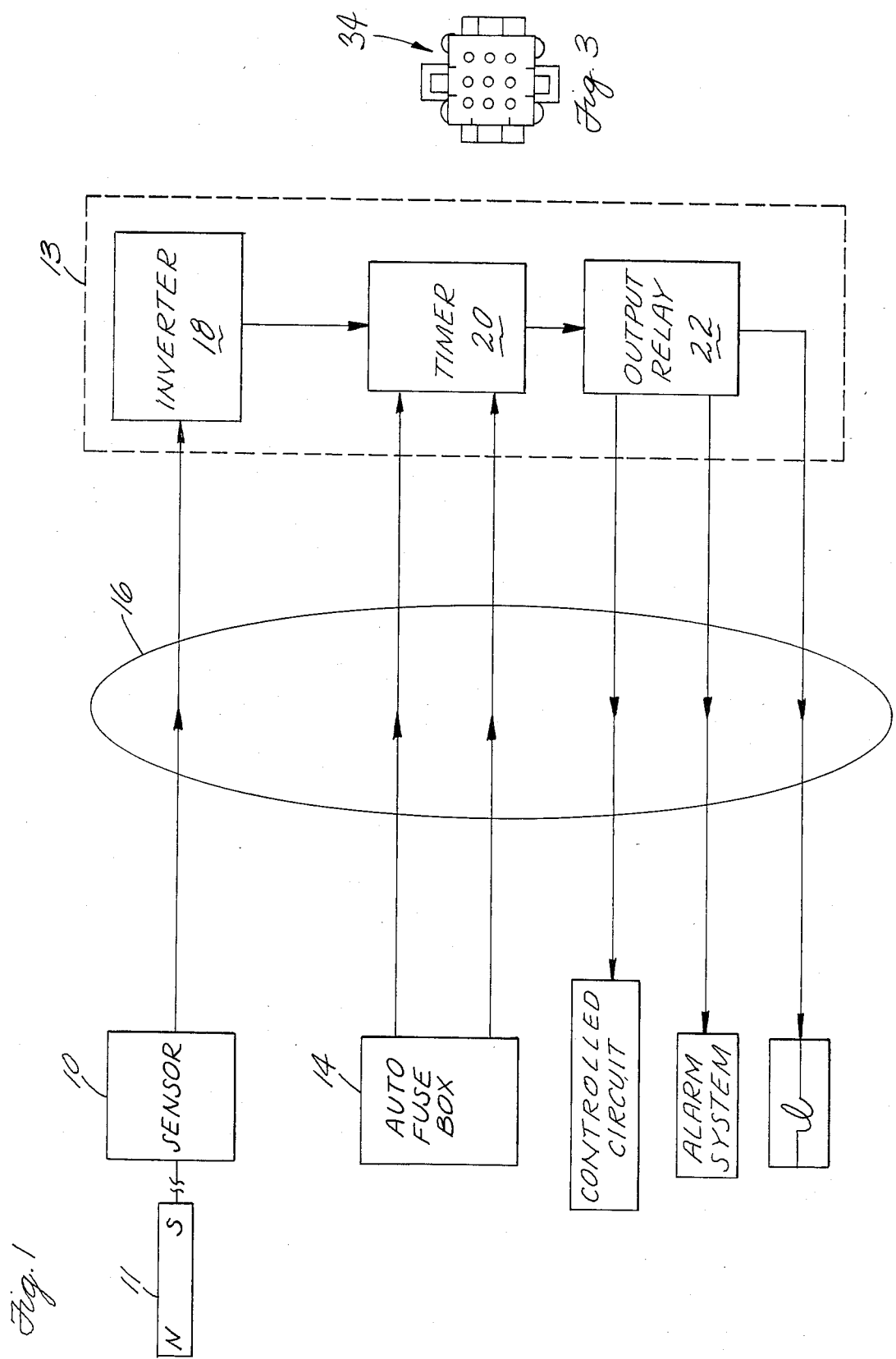
FIG. 1 is a functional block diagram of a vehicle anti-theft device in accordance with the present invention.

With reference now to the drawing, the disclosed embodiment of the present invention employs a Hall effect switch 10. Switch 10 may, for example, be a monolithic device such as Sprague Electric Company type UGS-35N20T which includes a magnetic field responsive semiconductor device and associated amplifier, trigger circuit, output stage and voltage regulator. This Hall effect switch has an advertised operating temperature range of from −40 C. to +150 C. and a switching point of 300 gauss. The Hall effect switch is an extremely sensitive and reliable device which will change state only when subjected to a magnetic field of the correct polarity and of sufficient strength. When the present invention is employed as an automobile theft prevention device, the Hall effect switch 10 will be mounted behind a non-metallic surface such as an automobile dashboard, door padding, etc. The purchaser of the system will be provided with a magnetic "key" 11 having the appropriate characteristics to cause switching of the magnetically actuated device 10. In the embodiment being described, where the above-identified Hall effect switch was employed, the "key" was a cylindrically-shaped magnet 1.50 inches long and 0.375 inches in diameter. This magnetic was comprised of "Alco V" material housed in a plastic container with a key ring attached. This permanent magnet had a field strength of 1,000 gauss. To operate the switch it is necessary to bring the south pole of the magnet to within approximately 0.085 inches of the switch. This, of course, requires very precise positioning of the magnet relative to the hidden Hall effect switch, i.e., it is highly unlikely the switch would be caused to operate by "scanning" the dashboard or door padding with a magnet or by an operator whose vision was blurred and/or reflexes temporarily impaired. Further, the security can be enhanced by a cascaded arrangement which requires the operation of a pair of hidden magnetically actuated switches within a preselected time period, the first switch controlling energization of a circuit comprising the second switch.

Figure 2:
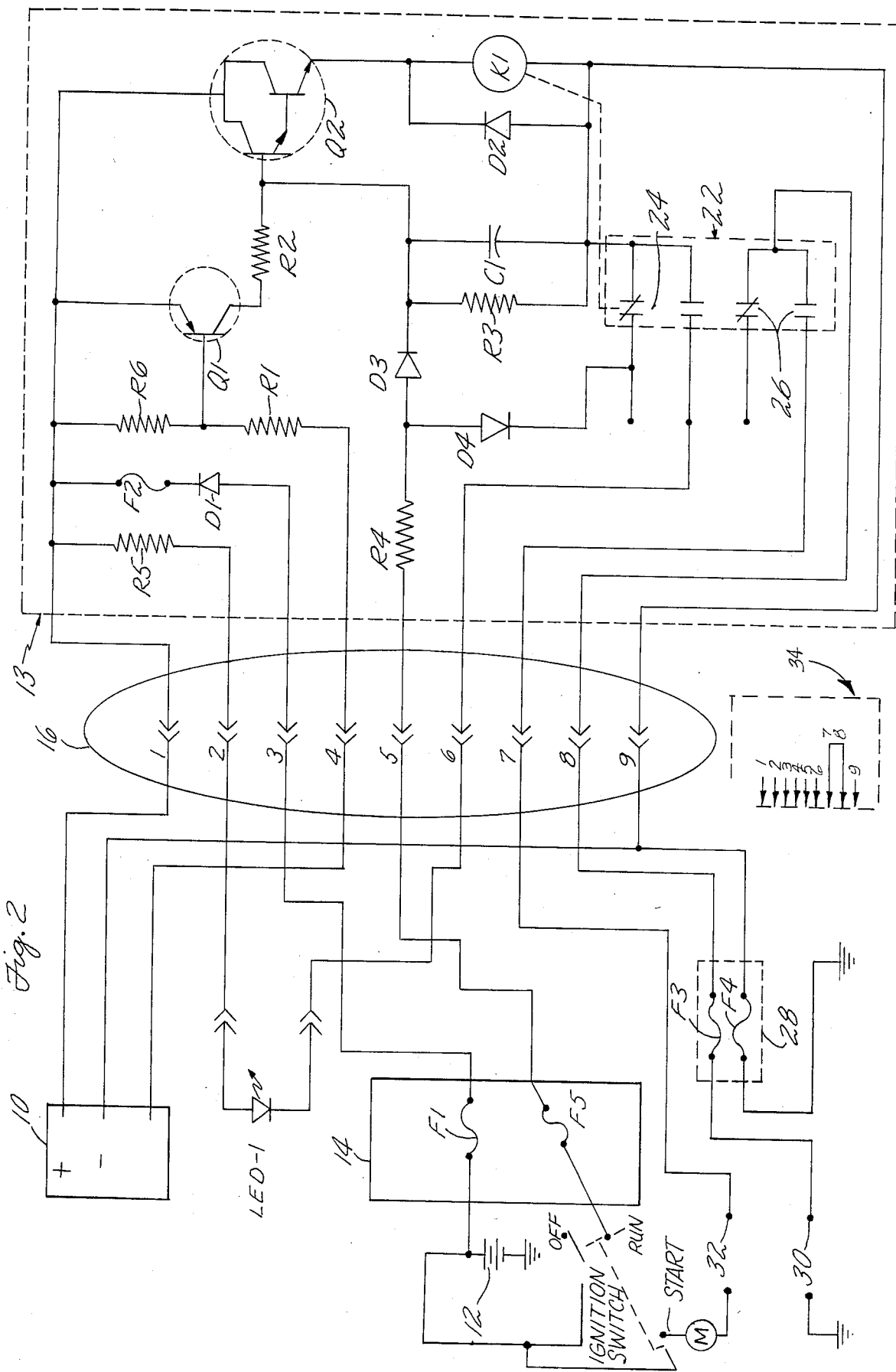
FIG. 2 is a schematic diagram of the apparatus of FIG. 1.

The Hall effect switch is a three terminal device and, as may be seen from FIG. 2, is permanently connected between ground and the positive terminal of the 12-volt dc supply 12 of the vehicle. The connection to the positive terminal of dc supply 12 is via a double fuze system including fuze F2 which is part of a control signal generator indicated generally at 13. Power for operating the disclosed embodiment is taken from the main fuze panel 14 of the vehicle and routed to and from the control signal generator 13 via a multi-conductor cable harness 16. The cable harness 16, as may be seen from FIG. 2, has nine conductors and terminates in a female receptacle having terminals 1–9. The terminals of this receptacle will typically be arranged in a square pattern.

When a magnet of sufficient strength and proper polarity is brought into proximity to the Hall effect switch 10, a negative signal will be generated and applied to an inverter 18 in control signal generator 13. This inverter, as the circuit is disclosed in FIG. 2, comprises merely a transistor Q1. The signal provided by the Hall effect switch 10 is developed across resistor R1, which forms part of a voltage divider comprising resistors R1 and R6, and thus appears at the base of Q1. The negative signal will bias transistor Q1 into conduction thus developing a positive signal at the collector of Q1. The positive output of the inverter comprises the enabling signal for a timer 20. Referring again to FIG. 2, the timer comprises a Darlington amplifier Q2, resistor R3 and capacitor C1. When transistor Q1 is turned on, capacitor C1 will begin to charge through resistor R4 from the dc supply 12. When capacitor C1 has charged sufficiently, the Darlington circuit will conduct whereupon current will flow through the coil K1 of a relay which is indicated generally at 22. Relay 22 is a double pole, double throw device.

When the magnetic "key" is drawn away from the Hall effect switch 10, transistor Q1 will turn off and capacitor C1 will begin to discharge through resistor R3. As capacitor C1 discharges, the bias on the Darlington amplifier Q2 will decrease and thus the current flow through coil K1 of relay 22 will also decrease. The time period before the relay "drops out" will be a function of the selected values of capacitor C1 and resistor R3 and will typically be chosen to be somewhere in the range of 10–25 seconds. Accordingly, if the vehicle is not started and the ignition switch turned to the "run" position within the time determined by the RC circuit, the starting system will return to its original disabled state. Resistor R6 insures turn-off of transistor Q1 when there is no negative signal applied to the base of transistor R1. Resistor R2 is a current limiting resistor which protects capacitor C1. Diode D1 protects Q1 and Q2 from damage should the polarity of the voltage source be inadvertently reversed. Diode D2 protects the Darlington circuit from damage due to voltage spikes when the relay 22 is de-energized, i.e., when the Darlington amplifier Q2 is turned off by the discharge of capacitor C1. Diode D3 is a one-way gate which also protects the timing circuit against reverse polarity. Diode D4 also functions as a gate which permits use of the normally closed contact of a first pair of contacts 24 of relay 22 to arm an alarm circuit or other apparatus, the common contact of contact pair 24 being connected to ground through fuze F4.

The common contact of a second pair of contacts 26 of relay 22 is connected to a first controlled terminal 30 via a fuze f3 of a fuze panel 28. The normally closed contact of relay contact pair 26 is not employed in the disclosed embodiment. The normally open contact of contact pair 26 is connected to terminal 32 and, when closed, short circuit conductors 7 and 8 of cable harness 16 and thus short circuits controlled terminals 30 and 32.

The normally open contact of contact pair 24 of relay 22 is connected to one side of a light emitting diode LED-1. The other side of diode LED-1 is connected, via a current limiting resistor R5, to the 12-volt supply via the cable harness 16 and internal wiring of the control signal generator 13. Thus, the flow of current through coil K1 of relay 22 will result in the light emitting diode providing a visual indication that the starting circuit has been enabled, i.e., that cable harness conductors and associated terminals 7 and 8 have been short-circuited. The light emitting diode will, of course, be mounted so as to be readily visable to the vehicle operator.

The common and normally open of contacts 26 of relay 22, i.e., output terminals 30 and 32, are typically connected, via the cable harness and fuze f3, in series with the vehicle starter relay. Thus, the closing of the normally open contacts of relay 22 will complete a path for current flow through the starter relay thus permitting the vehicle to be started. The present invention may be employed in any starting system since it is insensitive to the direction of current flow through the starter relay.

Should the vehicle on which the above-described system is installed require servicing, or should there be a component failure in signal generator 13, the cable harness 16 will be disconnected from the matching plug provided therefore on the signal generator and a service plug 34, see FIG. 3, inserted in the receptacle on the end of the cable harness. The service plug will have only two active, i.e., short circuited, pins which will complete the circuit between conductors terminals 7 and 8 of the cable in the disclosed embodiment. The cable harness, signal generator and service plug will, of course, be matched and may be "coded". The service plug will be sealed whereby determination of which terminals are employed in the starter relay circuit will be exceedingly difficult. FIG. 3 is a front view of a typical service plug having the above-mentioned square pin pattern.

In the typical mode of operation the magnetic "key" is brought into proximity to the area where the Hall effect switch 10 is hidden. In the manner described above, this will cause relay 22 to "pull in" thus energizing the light emitting diode LED-1. The light will remain on, when the magnetic "key" is removed, for at least that period of time determined by the values of resistor R3 and capacitor C1. Within this time the operator must insert his ignition key in the ignition lock and turn this key to the start position. The vehicle may then be started in the normal manner and the ignition switch will be released to the run/accessory position. If the vehicle should stall, and provided that the ignition switch has not been turned off, it may be restarted without use of the magnetic key because the charge on capacitor C1 will be maintained via resistor R4 and diode D3 after transistor Q1 turns off. Restated, the switching of relay contacts 24 will permit the charging of capacitor C1 from an ignition switch terminal which has the supply voltage applied thereto in the run/accessory position. Accordingly, once relay 22 has been energized, and the vehicle started, the relay will remain energized until after the ignition switch has been turned off. Turning the ignition switch to the run/accessory position without use of the magnetic "key", i.e., jumping the ignition switch, will not charge capacitor C1 and bias the Darlington amplifier into conduction because the normally closed contacts of contact pair 24 will ground, via diode D4, any positive potential applied to the ignition switch terminal connected to the cable harness 16. A positive potential applied to the input of Q2 with the relay 22 de-energized will not be grounded because of the blocking action of diode D3.

It is to be understood that the present invention is not limited to the embodiment described and shown herein, which is deemed to be merely illustrative of the best mode of carrying out the invention, and which is susceptible of modification of form, size, arrangement of parts and details of operation. The invention rather is intended to encompass all such modifications which are within its spirit and scope as defined by the claims.

What is claimed is:

1. Apparatus for controlling the state of an electrical circuit comprising:
    magnetic field responsive sensor means, said sensor means providing an output signal when subjected to a magnetic field of the appropriate strength and polarity;
    normally de-energized switch means, said switch means having a control input and at least first and second normally open contacts, said switch means being responsive to the application to the control input thereof of a switching control signal, energization of said switch means establishing a path for the flow of electrical current between said first and second normally open contacts;
    means responsive to an output signal provided by said sensor means for generating a switching control signal for energization of said switch means, said switching control signal generating means including means for maintaining the application of a switching control signal to said switch means control input for a predetermined time subsequent to termination of a sensor means output signal;
    means for connecting said switch means first and second normally open contacts in series with a circuit to be controlled, said connecting means including:
        a first multi-conductor electrical cable, at least two of the conductors of said cable being connected at first ends thereof to respective of said switch means first and second contacts;
        a second multi-conductor cable, at least two of the conductors of said second cable being connected at first ends thereof to the circuit to be controlled; and
        plug means for joining said first and second cable means, said plug means having a pair of separable portions connected to the second ends of the conductors of respective of said cables; and
        by-pass means, said by-pass means being complementary to and receivable in the said plug means portion associated with said second of said multi-conductor cable means, said by-pass means being employed to establish an electrical connection between the said at least two conductors when said plug means portions have been separated.

2. The apparatus of claim 1 wherein the circuit to be controlled is the starting circuit of a motor vehicle and wherein said sensor means is positioned behind a component of the vehicle which is comprised of a non-magnetic material.

3. The apparatus of claim 2 wherein the motor vehicle starting circuit includes an ignition switch and wherein said apparatus further comprises:
    means responsive to operation of the ignition switch of the vehicle starting circuit to the run position for causing continued generation of a switching control signal after expiration of said predetermined time.

4. The apparatus of claim 3 wherein said switching control signal generating means comprises:
    timing circuit means, said timing circuit means including a capacitance; and
    means responsive to an output signal provided by said sensor means for initiating the charging of said timing circuit means capacitance, the voltage across said capacitance comprising said switching control signal.

5. The apparatus of claim 4 wherein said switch means comprises:
    relay means, said relay means having a solenoid, said first and second normally open contacts of said switch means respectively comprising a stationary and a movable contact of said relay means, energization of said relay means solenoid causing movement of said movable contact relative to said stationary contact;
    a solid state switch, said switch being connected in series with said relay means solenoid, said solid state switch being normally non-conductive and being switched to the conductive state in response to a said switching control signal; and
    means connecting a current source across the series connection of said relay means solenoid and said solid state switch, said means for connecting a current source across said series connection including conductors of said first connecting means multi-conductor cable means.

6. The apparatus of claim 5 wherein said relay means includes at least second stationary and movable contacts, said second contacts comprising said means responsive to vehicle ignition switch operation for causing continued generation of a switching control signal, said second contacts being connected via conductors of said cable means to a first polarity terminal of the current source.

7. The apparatus of claim 6 wherein said means responsive to vehicle ignition switch operation further comprises:
   first diode means, said first diode means being polarized to conduct signals of second polarity from the vehicle ignition switch to the other of said second relay means contacts; and
   second diode means, said second diode means being polarized to conduct signals of the second polarity from the vehicle ignition switch to said switching control signal generating means when said relay means second contacts are in the open state.

8. The apparatus of claim 6 further comprising: light emitter means, said light emitter means being connected to said relay means and being responsive to the state of energization thereof to provide a visual status signal indicative of energization of said relay means solenoid.

9. The apparatus of claim 8 wherein said sensor means comprises:
   a Hall effect device.

10. The apparatus of claim 1 wherein said sensor means comprises:
    a Hall effect device.

11. The apparatus of claim 1 further comprising:
    light emitter means, said light emitter means being connected to said switch means and being responsive to the state of energization thereof to provide a visual status signal.

12. The apparatus of claim 1 wherein said switch means comprises:
    relay means, said relay means having a solenoid, said first and second normally open contacts of said switch means respectively comprising a stationary and a movable contact of said relay means, energization of said relay means solenoid causing movement of said movable contact relative to said stationary contact;
    a solid state switch, said switch being connected in series with said relay means solenoid, said solid state switch being normally non-conductive and being switched to the conductive state in response to a said switching control signal; and
    means connecting a current source across the series connection of said relay means solenoid and said solid state switch, said means for connecting a current source across said series connection including conductors of said first and second multi-conductor cables.

13. The apparatus of claim 12 wherein said switching control signal generating means comprises:
    timing circuit means, said timing circuit means including a capacitance; and
    means responsive to an output signal provided by said sensor means for initiating the charging of said timing circuit means capacitance, the voltage across said capacitance comprising said switching control signal.

14. The apparatus of claim 1 wherein said switching control signal generating means comprises:
    timing circuit means, said timing circuit means including a capacitance; and
    means responsive to an output signal provided by said sensor means for initiating the charging of said timing circuit means capacitance, the voltage across said capacitance comprising said switching control signal.

15. Apparatus for enabling the starting circuit of a motor vehicle, the vehicle starting circuit including an ignition switch, said apparatus comprising:
    magnetic field responsive sensor means, said sensor means including a Hall effect semiconductor device, said sensor means providing an output signal in response to the exposure of said Hall effect device to a magnetic field of the appropriate polarity and strength;
    normally de-energized switch means, said switch means having at least a first pair of contacts which are normally electrically isolated, said switch means including a normally non-conductive solid state switch having a control signal input terminal, said solid state switch being responsive to switching control signals applied to said input terminal, energization of said switch means establishing a path for the flow of electrical current between said contacts of said first pair;
    timing circuit means, said timing circuit means including a capacitance;
    means response to an output signal provided by said sensor means for initiating the charging of said timing circuit means capacitance, the voltage across said capacitance comprising said switching control signals;
    means for applying said switching control signals to said switch means control signal input terminal, said switching control signals being applied to said control signal input terminal for a pre-determined period of time subsequent to termination of a sensor means output signal;
    first multi-conductor electrical cable means, at least first ends of respective a pair of the conductors of said first cable means being connected to the contacts of said switch means first pair whereby said conductors of said pair will be electrically connected to one another upon energization of said switch means, the other ends of the conductors of said first cable means being terminated at a first multi-terminal connector;
    second multi-conductor cable means, at least two of the conductors of said second cable means being connected in the motor vehicle starting circuit, the conductors of said second cable means being terminated at first ends thereof in a second multi-terminal connector which is complementary to and selectively separable from said first connector whereby the said pair of conductors of said first cable means may respectively be alternately electrically connected to or disconnected from said two conductors of said second cable means; and
    a multi-terminal plug which is complementary to said second connector, at least two of the terminals of said plug being short-circuited to establish an electrical connection between said two connectors of said second cable means which are connected in the motor vehicle starting circuit when said cable means are disconnected and said plug installed in said second connector.

16. The apparatus of claim 15 wherein said switch means further comprises:
    relay means, said relay means having a solenoid, said first pair of contacts of said switch means respectively comprising a stationary and a movable contact of said relay means, energization of said relay means solenoid causing movement of said movable contact relative to said stationary contact, said solid state switch being connected in series with said relay means solenoid and being switched to the conductive state in response to a said switching control signal.

17. The apparatus of claim 15 further comprising:
means responsive to operation of the ignition switch of the vehicle starting circuit to the run position for causing continued generation of a switching control signal after expiration of said predetermined time.

18. The apparatus of claim 17 further comprising:
light emitter means, said light emitter means being connected to said switch means and being responsive to the state of energization thereof to provide a visual status signal.

* * * * *